(12) United States Patent
Tojyo et al.

(10) Patent No.: US 7,751,699 B2
(45) Date of Patent: Jul. 6, 2010

(54) IMAGE BLUR CORRECTING MECHANISM AND IMAGE-CAPTURE APPARATUS

(75) Inventors: Hiroaki Tojyo, Chiba (JP); Tomohiro Yasui, Tokyo (JP)

(73) Assignee: Sony Corporation, Tokyo (JP)

( * ) Notice: Subject to any disclaimer, the term of this patent is extended or adjusted under 35 U.S.C. 154(b) by 194 days.

(21) Appl. No.: 12/019,982

(22) Filed: Jan. 25, 2008

(65) Prior Publication Data

US 2008/0199166 A1 Aug. 21, 2008

(30) Foreign Application Priority Data

Feb. 21, 2007 (JP) ............................. 2007-041067

(51) Int. Cl.
G03B 17/00 (2006.01)
H04N 5/228 (2006.01)
G02B 27/64 (2006.01)

(52) U.S. Cl. ..................... 396/55; 348/208.11; 359/557

(58) Field of Classification Search .................. 396/52, 396/55; 348/208.99, 208.4, 208.5, 208.7, 348/208.11; 359/554, 557
See application file for complete search history.

(56) References Cited

U.S. PATENT DOCUMENTS

2006/0115258 A1* 6/2006 Nomura ........................ 396/55

FOREIGN PATENT DOCUMENTS

| JP | 8-248464 | 9/1996 |
| JP | 9-80545 | 3/1997 |
| JP | 9-80561 | 3/1997 |
| JP | 2000-221557 | 8/2000 |
| JP | 2001-117129 | 4/2001 |
| JP | 2003-270695 | 9/2003 |
| JP | 2006-128780 | 5/2006 |

* cited by examiner

Primary Examiner—Rochelle-Ann J Blackman
(74) Attorney, Agent, or Firm—Oblon, Spivak, McClelland, Maier & Neustadt, L.L.P.

(57) ABSTRACT

A image blur correcting mechanism for effecting image blur correction by moving a lens group in directions orthogonal to an optical axis of the lens group, includes a first guide shaft extending in a first direction which is a predetermined direction orthogonal to an optical axis direction of the lens group, a base frame supporting the first guide shaft, a first correcting moving frame supported by the base frame through the first guide shaft movably in the first direction, a second guide shaft extending in a second direction orthogonal to both of the optical axis direction and the first direction and supported by the first correcting moving frame, and a second correcting moving frame having a lens holding part holding the lens group, the second correcting moving frame being supported by the first correcting moving frame through the second guide shaft movably in the second direction, while being movable in the first direction along movement of the first correcting moving frame with respect to the base frame in the first direction.

8 Claims, 16 Drawing Sheets

IMAGE BLUR CORRECTING MECHANISM AND IMAGE-CAPTURE APPARATUS

BACKGROUND OF THE INVENTION

1. Field of the Invention

The present invention relates to a field of technology on a image blur correcting mechanism and an image-capture apparatus. More specifically, the present invention relates to a field of technology applied to improve accuracy of detection of a position of a lens group held to a second moving frame for correcting by setting both of a first regulating part and a second regulating part which are adapted to regulate a movement amounts of the second correcting moving frame to a base frame.

2. Description of the Related Art

Some image-capture apparatuses, such as video cameras and still cameras is provided with a image blur correcting mechanism adapted to effect image blur correction by moving a lens group in directions orthogonal to an optical axis of the lens group (See Japanese Patent Application Publication No. JP 2001-117129, Patent Document 1).

The image blur correcting mechanism of this type has a fixed frame (a base frame) and two movable frames (correcting moving frames) which may be moved in directions orthogonal to the optical axis with respect to the base frame, allowing the image blur correction to be effected by guiding the two movable frames by guide shafts, and moving the frames in two different directions orthogonal to an optical axis direction.

According to the image blur correcting mechanism as described above, there are provided a first regulating part and a second regulating part respectively for regulating unnecessary movements in two directions orthogonal to the optical axis direction, that is, a yaw direction (a first direction) and a pitch direction (a second direction), when a first correcting moving frame and a second correcting moving frame are moved with respect to the base frame in the yaw direction and the pitch direction.

The image blur correcting mechanism in the related art includes those adapted to regulate the amount of movement in the yaw direction by providing a regulated pin adapted to contact the first regulating part of the base frame to the first correcting moving frame, and also, to regulate the amount of movement in the pitch direction by providing a regulated pin adapted to contact the second regulating part of the first correcting moving frame to the second correcting moving frame holding the lens group.

SUMMARY OF THE INVENTION

However, if the amount of movements in the yaw direction and the pitch direction is adapted to be regulated by providing the regulated pins respectively to the first correcting moving frame and the second correcting moving frame like the image blur correcting mechanism in the related art, positional regulation of the second correcting moving frame holding the lens group is adapted to be performed to the base frame through the first correcting moving frame. Thus, there has been the possibility that both of a tolerance of the first correcting moving frame with respect to the base frame and a tolerance of the second correcting moving frame with respect to the first correcting moving frame have effects on position accuracy, resulting in degradation of the accuracy of detection of the position of the lens group with respect to the base frame.

Accordingly, the present invention is intended to provide a image blur correcting mechanism and an image-capture apparatus, which intends to improve accuracy of detection of a position of a lens group by solving the issues.

In order to solve the above issues, a image blur correcting mechanism and an image-capture apparatus according to the present invention respectively includes a first guide shaft extending in a first direction which is a predetermined direction orthogonal to an optical axis direction of a lens group, a base frame supporting the first guide shaft, a first correcting moving frame supported by the base frame in a movable manner through the first guide shaft in the first direction, a second guide shaft extending in a second direction which is orthogonal to both of the optical axis direction and the first direction and supported by the first correcting moving frame, and a second correcting moving frame having a lens holding part for holding the lens group, the second correcting moving frame being supported by the first correcting moving frame through the second guide shaft movably in the second direction, while being adapted to be movable in the first direction along movement of the first correcting moving frame with respect to the base frame in the first direction. The base frame has a first regulating part and a second regulating part respectively which regulate the amount of movements of the second correcting moving frame in the first direction and the second direction by making the second correcting moving frame contact the base frame. The first regulating part and the second regulating part are provided on the approximately same plane which is orthogonal to the optical axis direction.

Thus, according to the image blur correcting mechanism and the image-capture apparatus of the present invention, detection of a lens group position is made on the basis of a contact position of the second correcting moving frame with respect to the first regulating part and the second regulating part provided in the base frame.

The image blur correcting mechanism according to the present invention is a image blur correcting mechanism adapted to effect image blur correction by moving a lens group in directions orthogonal to an optical axis of the lens group, and includes a first guide shaft extending in a first direction which is a predetermined direction orthogonal to an optical axis direction of the lens group, a base frame for supporting the first guide shaft, a first correcting moving frame supported by the base frame through the first guide shaft in a movable manner in the first direction, a second guide shaft extending in a second direction which is orthogonal to both of the optical axis direction and the first direction and supported by the first correcting moving frame, and a second correcting moving frame having a lens holding part for holding the lens group, the second correcting moving frame being supported by the first correcting moving frame through the second guide shaft in a movable manner in the second direction, while being movable in the first direction along movement of the first correcting moving frame with respect to the base frame in the first direction. The base frame has a first regulating part and a second regulating part both adapted to regulate the amount of movements of the second correcting moving frame in the first direction and the second direction by making the second correcting moving frame contact the base frame. The first regulating part and the second regulating part are provided on the approximately same plane orthogonal to the optical axis direction.

Thus, regulation of the movement of the second correcting moving frame takes place between the second correcting moving frame and the base frame without the first correcting moving frame. For that reason, a tolerance of the second correcting moving frame with respect to the first correcting moving frame has no effect on position accuracy, resulting in improved accuracy of detection of a position of the lens group with respect to the base frame.

According to an embodiments the present invention, the base frame, the first correcting moving frame and the second correcting moving frame are arranged in order in the optical axis direction, a lens arrangement hole is provided to the base frame, a lens insertion hole is provided to the first correcting moving frame, and the lens holding part of the second correcting moving frame is placed at the lens arrangement hole of the base frame through insertion into the lens insertion hole of the first correcting moving frame such that the lens holding part of the second correcting moving frame may make contact with the first regulating part and the second regulating part of the base frame. Thus, the first regulating part and the second regulating part may be provided within the same plane by a simple configuration.

According to a different embodiment of the present invention, the first regulating part and the second regulating part of the base frame are provided at the opposite sides with the lens holding part of the second correcting moving frame placed in between in the direction orthogonal to the optical axis direction. Thus, portions inadaptable to be provided with the first regulating part and the second regulating part may be utilized as an installation space for other parts, thereby enabling downsizing by effective space utilization.

According to a further different embodiment of the present invention, the first regulating part and the second regulating part of the base frame are located around the lens holding part of the second correcting moving frame. Thus, detection of the position of the lens group constantly with stable accuracy becomes possible.

The image-capture apparatus according to embodiments of the present invention relates to an image-capture apparatus having a image blur correcting mechanism adapted to effect image blur correction by moving a lens group in directions orthogonal to an optical axis of the lens group, and includes a first guide shaft extending in a first direction which is a predetermined direction orthogonal to an optical axis direction of the lens group, a base frame adapted to support the first guide shaft, a first correcting moving frame supported by the base frame through the first guide shaft movably in the first direction, a second guide shaft extending in a second direction which is orthogonal to both of the optical axis direction and the first direction and supported by the first correcting moving frame, and a second correcting moving frame having a lens holding part adapted to hold the lens group, the second correcting moving frame being supported by the first correcting moving frame through the second guide shaft movably in the second direction, while being movable in the first direction along movement of the first correcting moving frame with respect to the base frame in the first direction. The base frame has a first regulating part and a second regulating part respectively adapted to regulate the amount of movements of the second correcting moving frame in the first direction and the second direction by making the second correcting moving frame contact with the base frame, and the first regulating part and the second regulating part are located within the approximately same plane orthogonal to the optical axis direction.

Thus, regulation of the movement of the second correcting moving frame performed between the second correcting moving frame and the base frame without existence of the first correcting moving frame. For that reason, a tolerance of the second correcting moving frame with respect to the first correcting moving frame has no effect on position accuracy, thereby enabling detection of a position of the lens group with respect to the base frame with improved accuracy.

BRIEF DESCRIPTION OF THE DRAWINGS

FIG. 1 is a perspective view showing an image-capture apparatus in a condition where a lens barrel is housed in an apparatus body;

FIG. 2 is a perspective view showing the image-capture apparatus in a condition where the lens barrel is projected out from the apparatus body;

FIG. 3 is a perspective view showing the image-capture apparatus as viewed from a direction opposite to that shown in FIGS. 1 and 2;

FIG. 4 is an enlarged perspective view of the lens barrel;

FIG. 5 is an enlarged exploded perspective view of a movable lens unit;

FIG. 6 is an enlarged exploded perspective view showing a part of the movable lens unit as viewed from a direction opposite to that shown in FIG. 5;

FIG. 7 is an enlarged exploded perspective view showing guide bearings and a first sub-guide shaft;

FIG. 8 is an enlarged sectional view showing a condition where the first sub-guide shaft is fixed to the guide bearings;

FIGS. 9 to 11 show condition of a guide bearing when the first sub-guide shaft is held by the guide bearings, and FIG. 9 is an enlarged sectional view showing the condition before the first sub-guide shaft is inserted to the guide bearings;

FIG. 10 is an enlarged sectional view showing the condition where the first sub-guide shaft is in the process of insertion to the guide bearings;

FIG. 11 is an enlarged sectional view showing the condition where the first sub-guide shaft is inserted and held by the guide bearings;

FIG. 12 is an enlarged exploded perspective view showing the movable lens unit in a condition where a first correcting moving frame is supported by a base frame;

FIG. 13 is an enlarged sectional view of the movable lens unit;

FIG. 14 is an enlarged exploded perspective view showing the movable lens unit in a condition where the first correcting moving frame is supported by the base frame, and a second correcting moving frame is supported by the first correcting moving frame;

FIG. 15 is an enlarged front view showing a positional relation between regulating parts provided to the base frame and subject to regulation parts provided to the second correcting moving frame;

FIG. 16 is an enlarged exploded perspective view showing a part of the movable lens unit in a condition where the second correcting moving frame is supported by the first correcting moving frame;

FIG. 17 is an enlarged perspective view of the movable lens unit; and

FIG. 18 is an enlarged perspective view of the movable lens unit as viewed from a direction opposite to that shown in FIG. 17.

DETAILED DESCRIPTION OF THE EMBODIMENT

Embodiments for applying the present invention will be described with reference to the accompanying drawings.

The embodiment shown below represents an application of an image-capture apparatus of the present invention to a still camera, and also an application of a image blur correcting mechanism of the present invention to a image blur correcting mechanism mounted to the still camera. It is noted that application range of the present invention is not limited to the still camera or the image blur correcting mechanism mounted to the still camera, but may be widely applied to various types of image-capture apparatuses built in video cameras and other apparatuses or to various types of image blur correcting mechanisms mounted to these types of image-capture apparatuses.

In the following description, it is assumed that longitudinal, vertical and lateral directions viewed from a photographer at the time of shooting with the still camera are shown. Thus, an object side becomes the front, and a photographer side becomes the rear.

It is noted that the longitudinal, vertical and lateral directions shown below are for the convenience of descriptions, and not limited to the directions, as far as the embodiments of the present invention are concerned.

Figure 1:
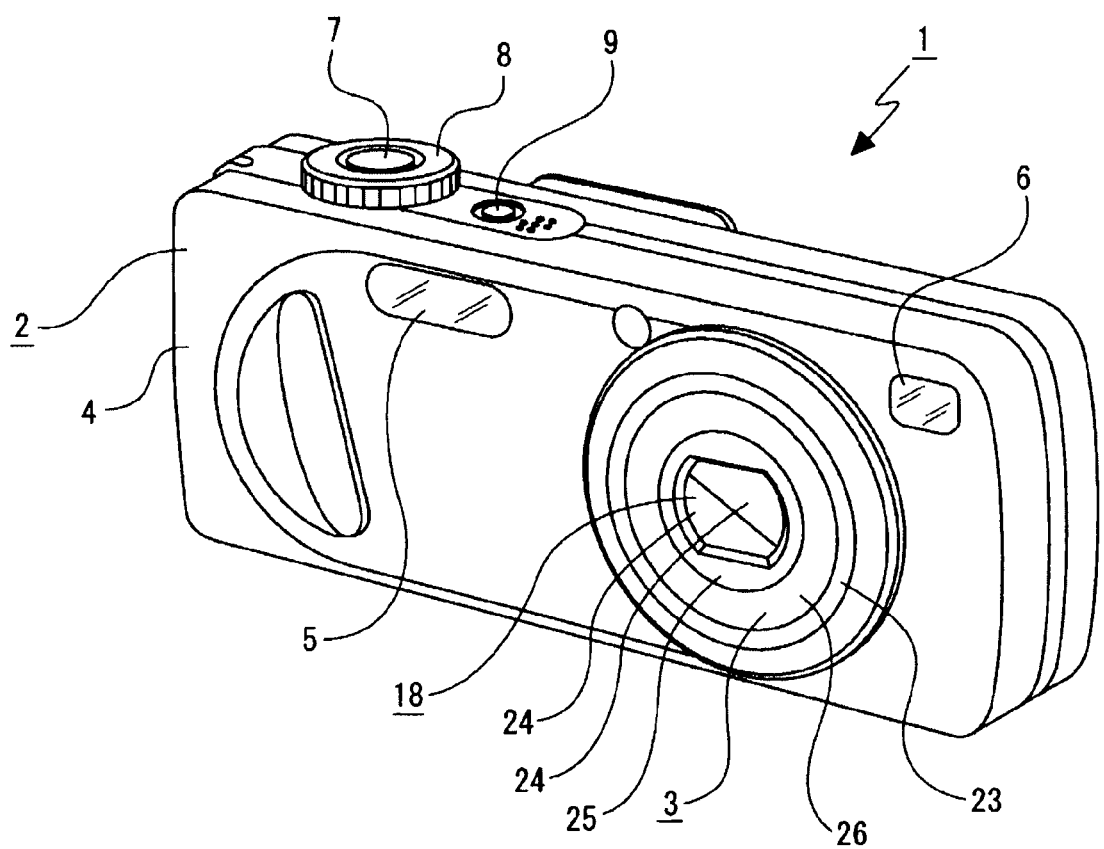
FIGS. 1 to 18 show an embodiment of a image blur correcting mechanism of the present invention, as well as an embodiment of an image-capture apparatus of the present invention.
Figure 2:
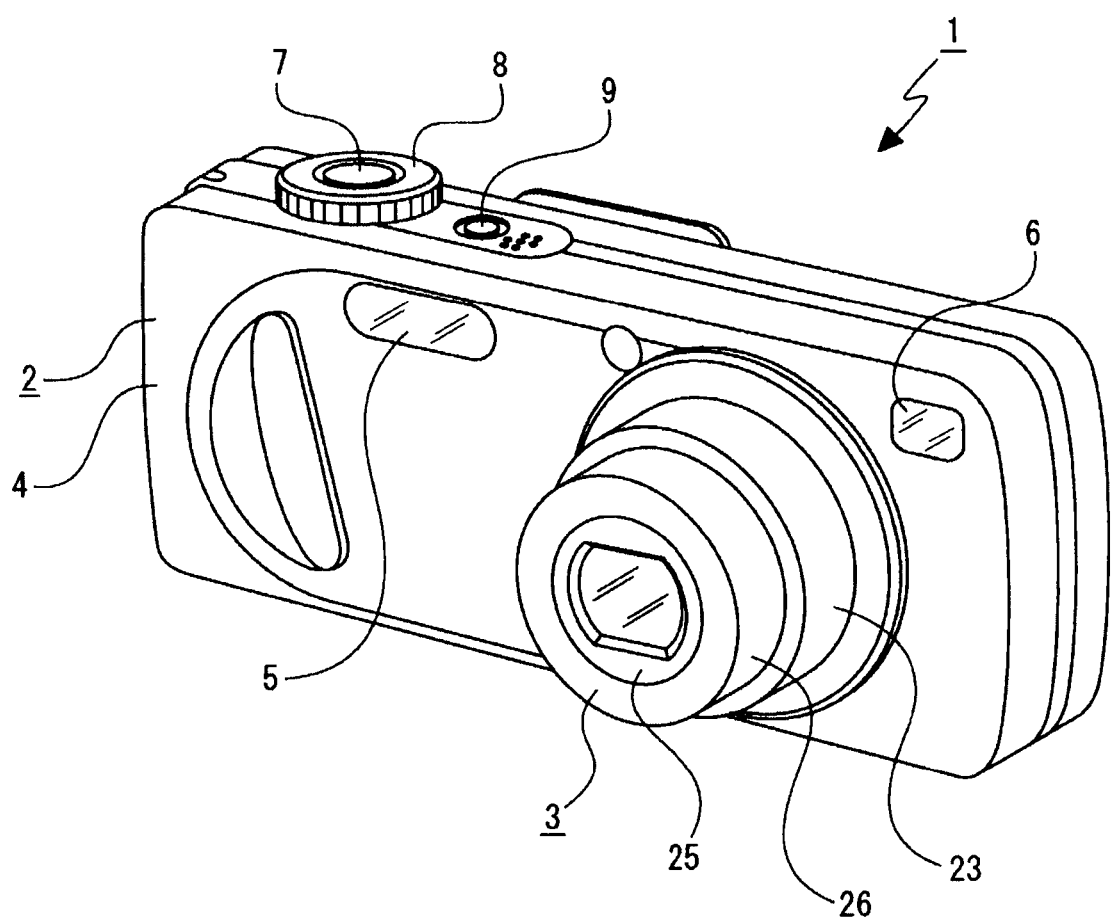

As shown in FIGS. 1 and 2, an image-capture apparatus 1 is an apparatus having an apparatus body 2, and a lens barrel 3 supported with the apparatus body 2 in a longitudinally (an optical axis direction) extendable manner, more specifically, a lens barrel 3 of so-called collapsible mount type in which the lens barrel 3 is housed (See FIG. 1) in the apparatus body 2 during non-shooting time, and the lens barrel 3 is projected (See FIG. 2) from the apparatus body 2 to the front side during shooting.

Installing such a lens barrel 3 of collapsible mount type may enable both downsizing (a reduction in thickness) in the period of non-shooting and maintenance of excellent optical performances in the period of shooting.

Figure 3:
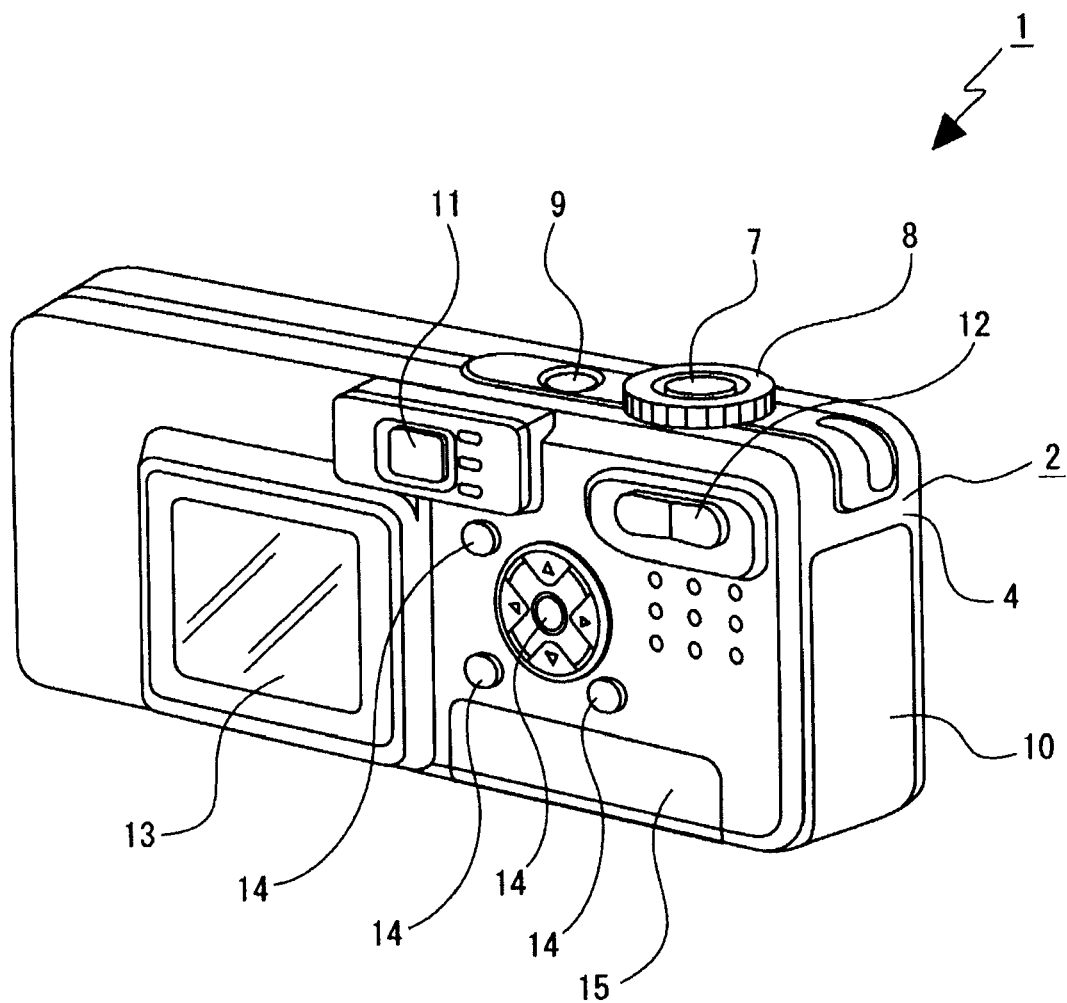

The apparatus body 2 is formed, for instance, by providing required units at inside and outside of a horizontally-long flat casing 4 (See FIGS. 1 to 3).

The apparatus body 2 has a flash 5 and a viewfinder window 6 on the front surface. The apparatus body 2 has a shutter button 7, a mode select dial 8 and a power button 9 on the upper surface. The apparatus body 2 has a battery cover 10 on the side surface (the right surface), and an operation of putting in and out a battery (not shown) with respect to the apparatus body 2 may be effected by opening and closing the battery cover 10. The apparatus body 2 has a viewfinder 11, a zoom switch 12, a display 13, operation buttons 14, 14, ... and a terminal cover 15 on the rear surface. Terminals (not shown), such as a power terminal and an input/output terminal are provided at inside of the terminal cover 15.

Figure 4:
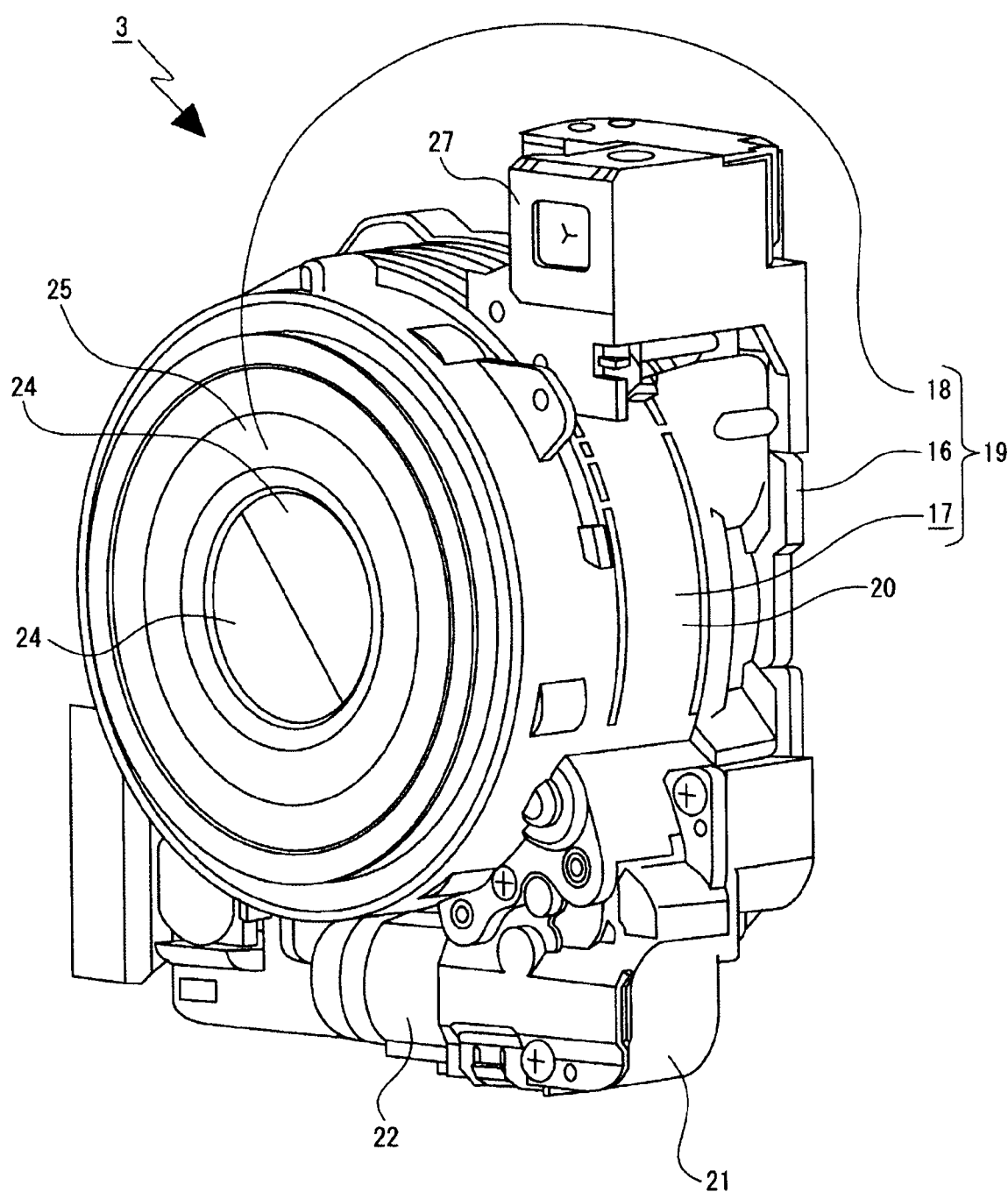

As shown in FIG. 4, the lens barrel 3 is configured by arranging required members at inside and outside of an outer lens-barrel casing 19. The casing 19 includes a fixing member 16, a fixed ring 17 fixed to a front end of the fixing member 16 and a lens barrier 18 fixed to a front end of the fixed ring 17.

An imaging unit (not shown) is mounted to the fixing member 16 from the rear side. The imaging unit has a Charge Coupled Device (CCD) as an imaging device, for instance.

The fixed ring 17 has a cylindrical base part 20 taking an approximately cylindrical form. A gear block 21 is mounted at a lower end of the cylindrical base part 20, and a motor 22 serving as a drive source for telescopic motions of the lens barrel 3 with respect to the apparatus body 2 is mounted to the gear block 21.

A ornament ring 23 is mounted to the front half of the fixed ring 17 (See FIG. 2).

The lens barrier 18 includes a pair of opening/closing members 24, 24 supported by a circular holder 25 so that an optical path is opened and closed by putting the opening/closing members 24, 24 into operations. With the lens barrier 18 mounted to the fixed ring 17, a wraparound ring 26 is mounted to the outer circumference side of the lens barrier 18 (See FIGS. 1 and 2).

A viewfinder block 27 is mounted to a position close to a top end on the outer circumference of the outer lens-barrel casing 19. The viewfinder block 27 is located right behind the viewfinder window 6, in the state where arranged within the casing 4 of the apparatus body 2.

The lens barrel 3 is adapted to support three movable units inside the outer lens barrel casing 19, for instance, movably in the optical axis direction (the longitudinal direction). The three movable units are referred to as a first movable unit, a second movable unit and a third movable unit in order from the fore side. The second movable unit is configured by coupling an aperture stop device (not shown) and a movable lens unit 28 back-and-forth, for instance.

Figure 5:
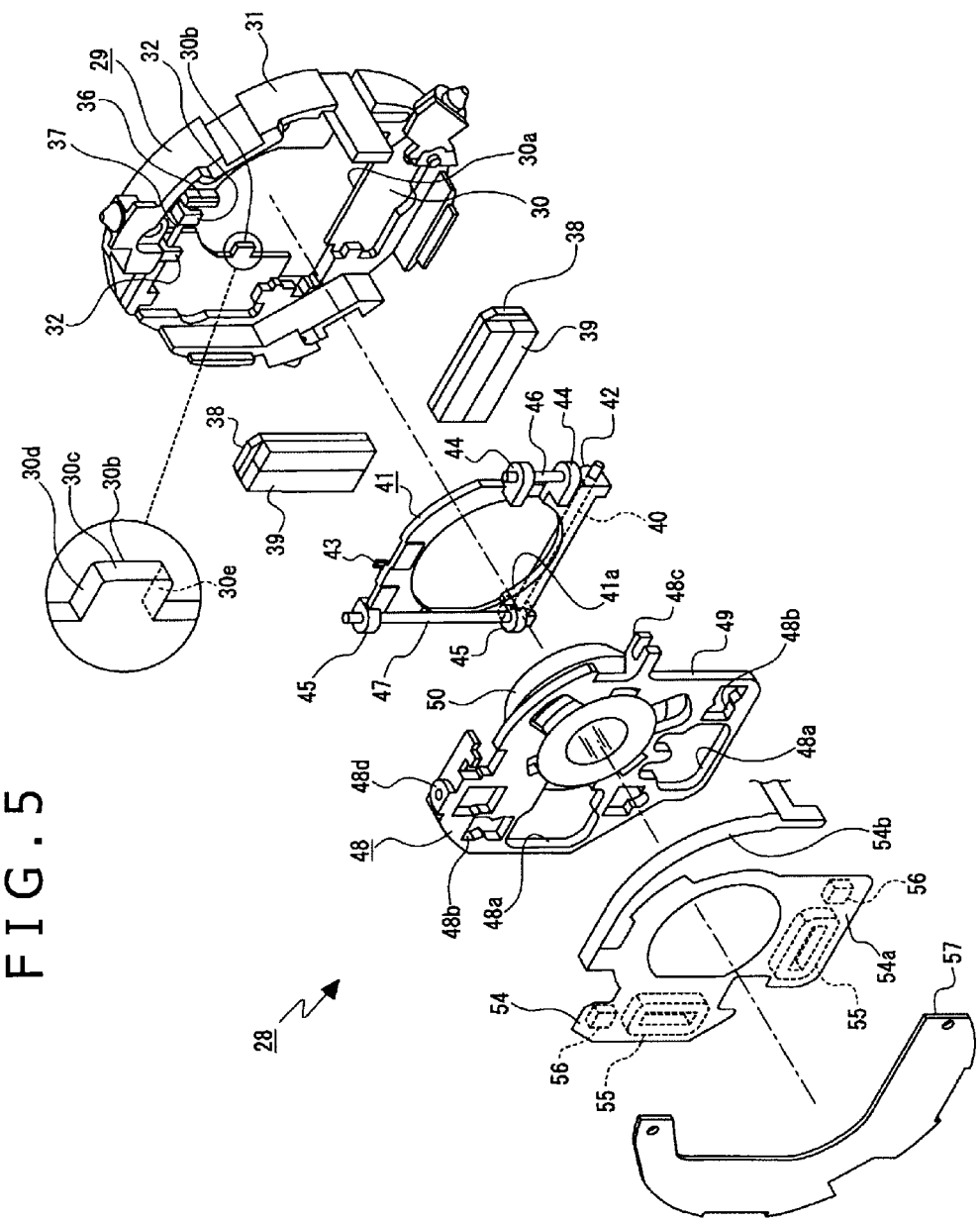
Figure 6:
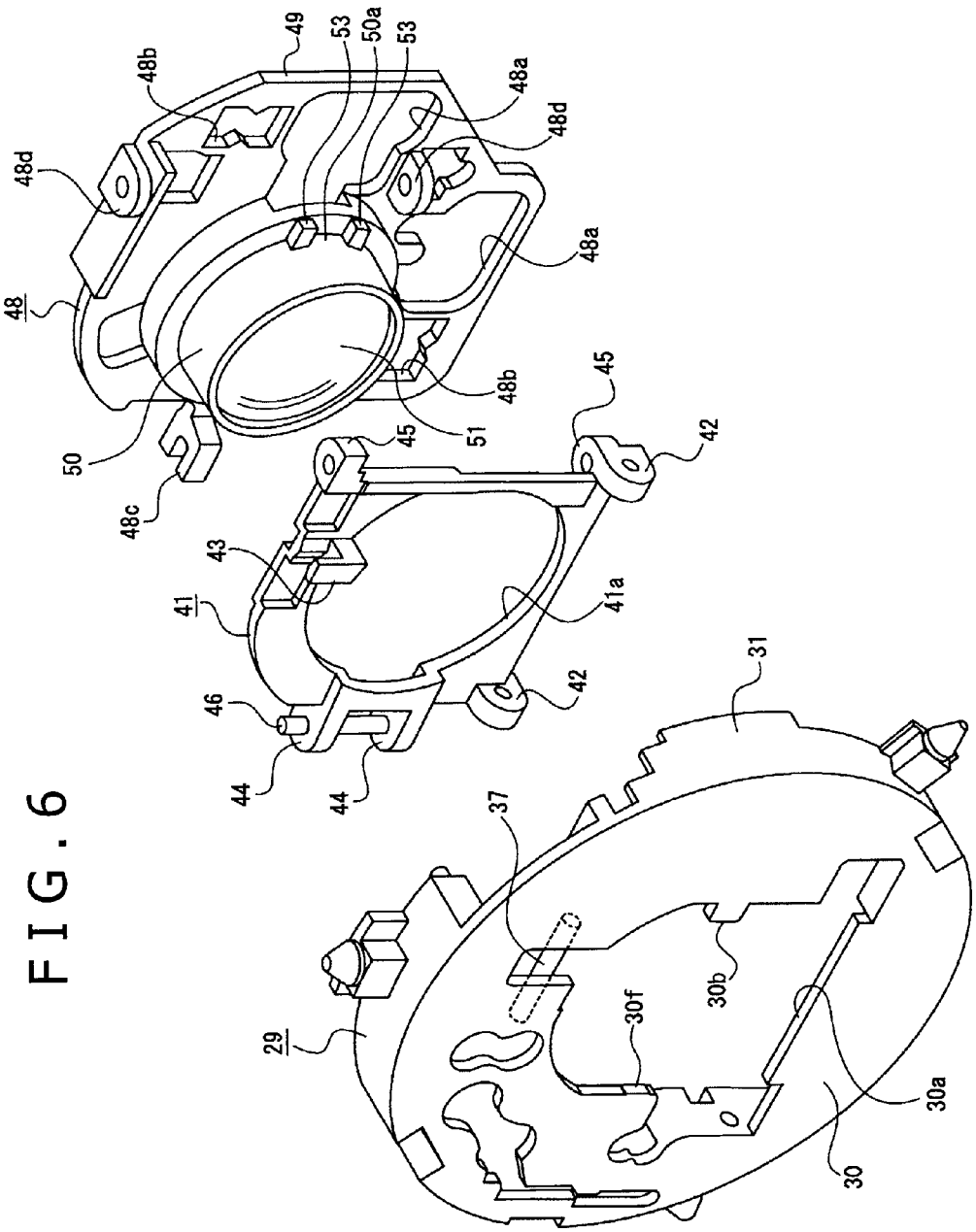

The movable lens unit 28 includes a base frame 29 to which required members are supported or mounted (See FIGS. 5 and 6).

The base frame 29 is formed with a resin material, and has a disc part 30 and a supported surface part 31 provided on the outer circumference of the disc part 30.

The disc part 30 has a longitudinally pierced lens arrangement hole 30a in the center. The disc part 30 has a leftward protrudent tongue-shaped regulating projection 30b at a right opening edge on the lens arrangement hole 30a. The regulating projection 30b is in the form of a rectangular shape whose left side surface is formed as a first regulating part 30c, and whose upper and lower surfaces is formed as second regulating parts 30d, 30e, respectively. An portion located directly at the left of the regulating projection 30b of a left opening edge on the lens arrangement hole 30a is formed as a first regulating part 30f facing the right side.

The first regulating parts 30c, 30f and the second regulating parts 30d, 30e are all located within the same plane orthogonal to the optical axis direction.

Figure 7:
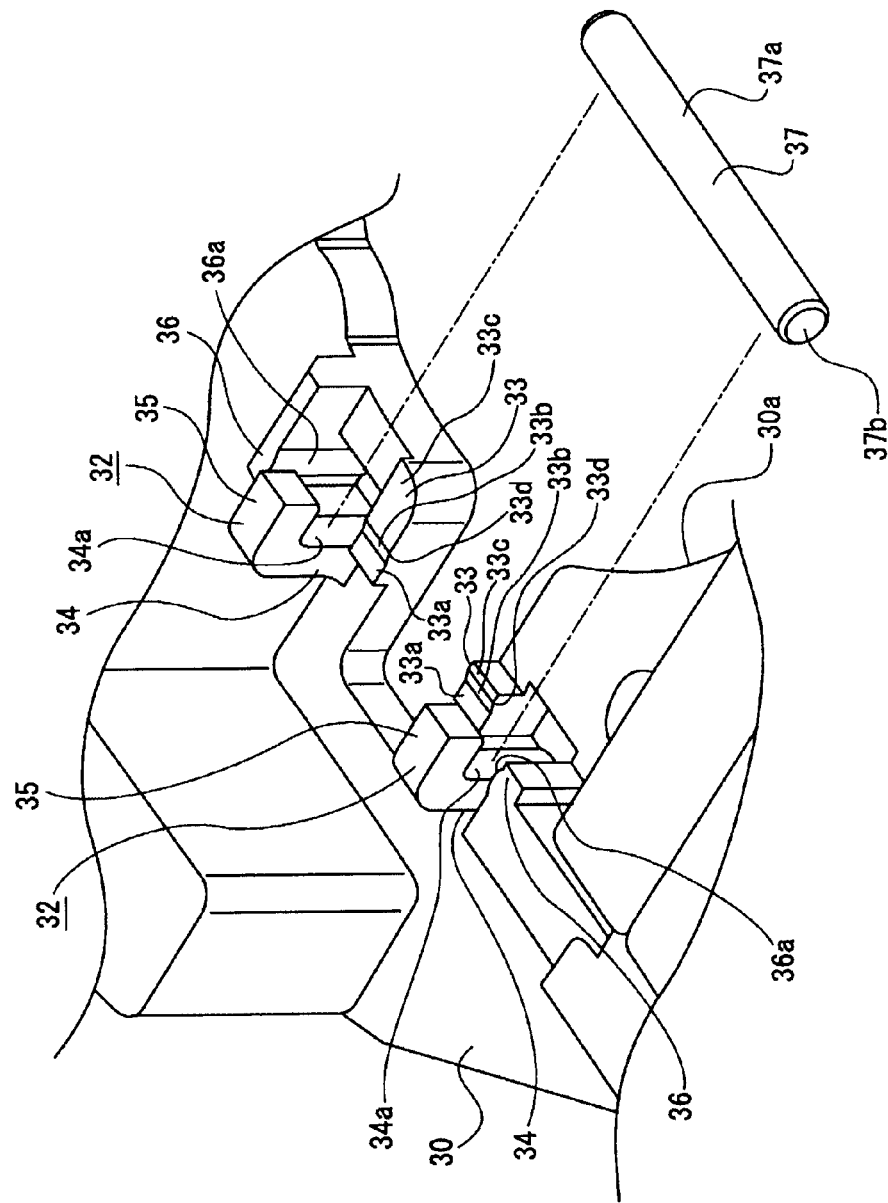

The disc part 30 has guide bearings 32, 32 on the front surface so as to be located at the upper side of the lens arrangement hole 30a (See FIG. 5). As shown in FIG. 7, each of the guide bearings 32, 32 is in the form of a channel having a rectangular shape without left vertical line opened to the lower side, and has a base part 33 extending forward in a protuberant form from the disc part 30, a connection part 34 protruding forward from the disc part 30, and a holding projection 35, 35 protruding downward from a front end of the connection part 34, 34. The base parts 33, 33 are located directly inside the connection parts 34, 34 and the holding projections 35, 35 in the lateral direction.

The front surface of each base part 33 is composed of a shaft receiving surface 33a facing to the fore, a shaft holding surface 33b continuously extending from a lower end of the shaft receiving surface 33a, and an introduction surface 33c continuously extending from a lower end of the shaft holding surface 33b and facing to the fore. The shaft holding surface 33b is inclined such that it forms a gentle concave curved surface adapted to provide forward displacement as it advances downward. Thus, the base part 33 has the shaft holding surface 33b and the introduction surface 33c in more fore positions than the shaft receiving surface 33a, causing the shaft holding surface 33b and the introduction surface 33c to form a holding projection 33d adapted to hold a guide shaft described later.

Figure 8:
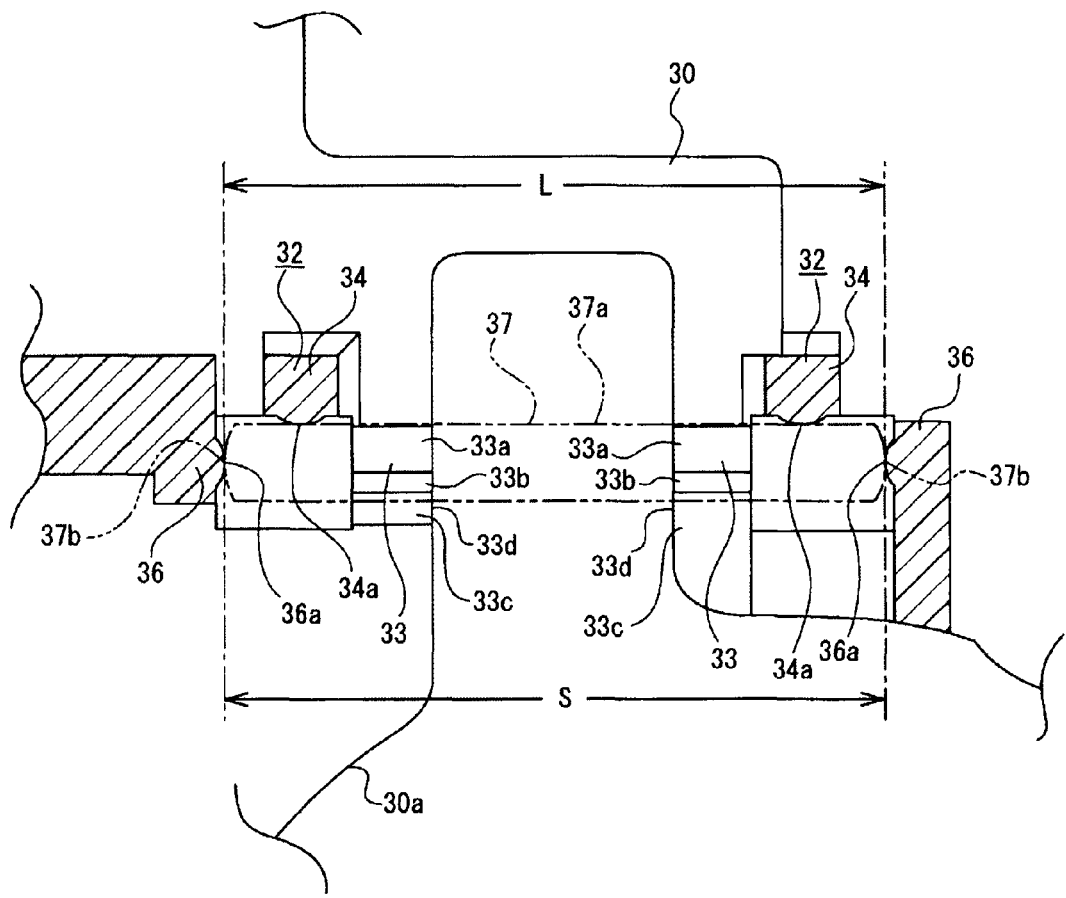

The connection part 34 has a contact projection 34a protruding downward from the lower surface of this connection part (See FIG. 8). The outer surface of the contact projection 34a is in the form of a curved surface whose center in the lateral direction is in a lowest position, for instance.

Figure 9:
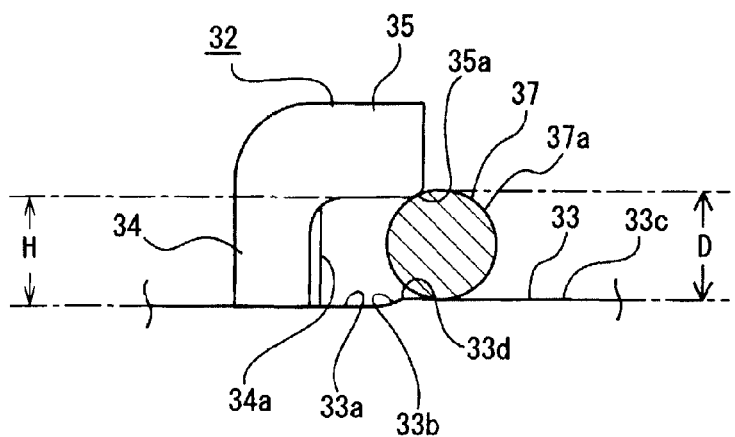

The rear surface of the holding projection 35 takes a planar form, for instance (See FIG. 9). A guide edge 35a adapted to provide displacement upward as an advance is made rearward is formed to the rear edge on a lower end of the holding projection 35.

The guide bearings 32, 32 have respectively thrust holding projections 36, 36 at outer positions in the lateral direction (See FIGS. 7 and 8). The thrust holding projections 36, 36 are respectively provided in a manner protrudent forward from the disc part 30, and have respectively, on the surfaces facing to each other, holding support projections 36a, 36a protruding in directions nearer to each other are provided. The outer surface of each of the holding support projections 36a, 36a is in the form of a curved surface whose center in the vertical direction is in an innermost position, for instance.

A first sub-guide shaft 37 is held in an inserted condition between the guide bearings 32, 32. As shown in FIG. 9, the first sub-guide shaft 37 has a shaft diameter D sized to be approximately equal to a height H between the shaft receiving surface 33a of the base part 33 and the rear surface of the holding projection 35.

The first sub-guide shaft 37 takes a longitudinally longer form, and has a length L in axial direction to be approximately equal to the shortest distance between the holding support projections 36a, 36a of the thrust holding projections 36, 36. The first sub-guide shaft 37 is inserted between the guide bearings 32, 32 from the lower side. Insertion of the first sub-guide shaft 37 to the guide bearings 32, 32 from the lower side is made as an outer surface 37a slides along the introduction surface 33c and the guide edge 35a (See FIG. 9). In this case, the guide edge 35a takes the form adapted to provide the displacement upward as the edge advances rearward, resulting in secure achievement of an excellent performance of insertion of the first sub-guide shaft 37 to the guide bearings 32, 32.

Figure 10:
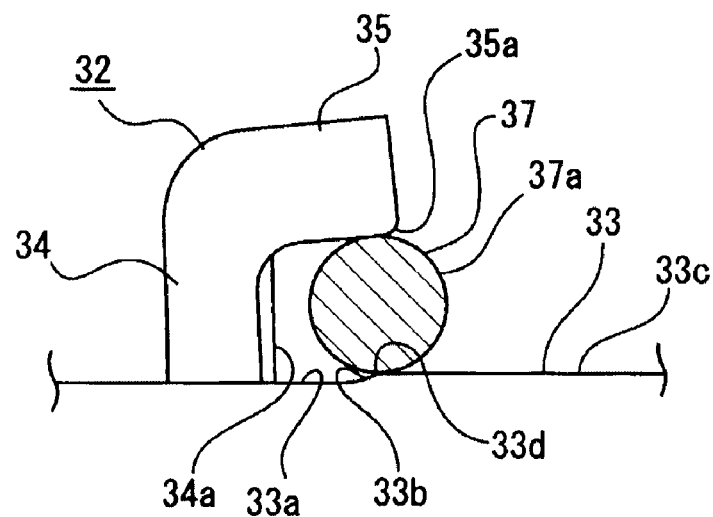
Figure 11:
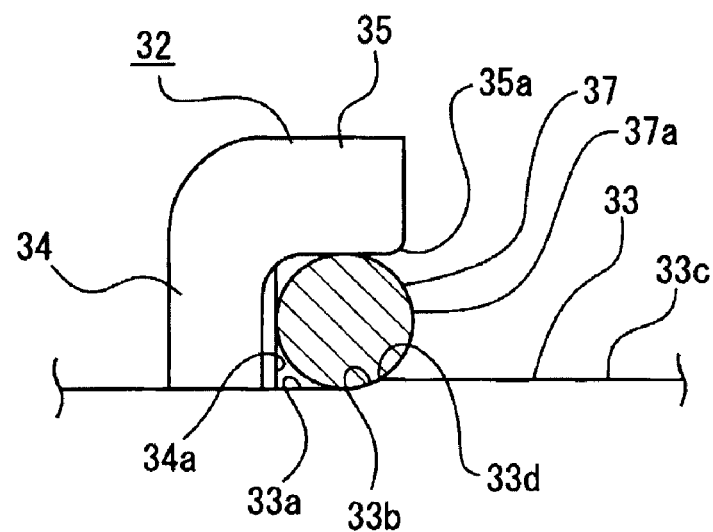

As the first sub-guide shaft 37 is inserted to the guide bearings 32, 32 from the lower side, the connection parts 34, 34 and the holding projections 35, 35 are subjected to elastic deformation by the first sub-guide shaft 37, causing the guide bearings 32, 32 to become forced more open, as shown in FIG. 10.

When the first sub-guide shaft 37 is inserted up to the back side of the guide bearings 32, 32, contact is made between the first sub-guide shaft 37 and the shaft receiving surfaces 33a, 33a and the shaft holding surfaces 33b, 33b of the base parts 33, 33, the contact projections 34a, 34a of the connection parts 34, 34 and the rear surfaces of the holding projections 35, 35, followed by elastic return of the connection parts 34, 34 and the holding projections 35, 35 from their elastically deformed condition, causing the first sub-guide shaft 37 to be held and fixed by the guide bearings 32, 32.

Accordingly, there is no need to apply pressure insertion by use of dedicated jigs to effect holding of the first sub-guide shaft 37 with the guide bearings 32, 32, resulting in achievement of enhanced workability in works of fitting the first sub-guide shaft 37 to the guide bearings 32, 32.

Further, there is no need to apply bonding to fix the first sub-guide shaft 37 to the guide bearings 32, 32, resulting in prevention of defects that a forced-out adhesive portion degrades a sliding performance of a first correcting moving frame 41 with respect to the first sub-guide shaft 37.

With the first sub-guide shaft 37 held by the guide bearings 32, 32, elasticity of the guide bearings 32, 32 causes the first sub-guide shaft 37 to be held down in a caught-in condition by the base parts 33, 33 and the holding projections 35, 35 from the anteroposterior direction. At this time, the first sub-guide shaft 37 is held in a condition where the outside surface 37a is in point contact with the contact projections 34a, 34a of the connection parts 34, 34. Thus, the first sub-guide shaft 37 held by the guide bearings 32, 32 may be prevented from being in an unsteady and saccadic condition, resulting in achievement of a stabled hold condition.

With the first sub-guide shaft 37 inserted between the guide bearings 32, 32 in the above manner, the axially opposite end surfaces 37b, 37b of the first sub-guide shaft 37 are held down from the axial direction by making contact with the holding support projections 36a, 36a of the thrust holding projections 36, 36. Thus, the first sub-guide shaft 37 is prevented from being misaligned in the axial direction. In this case, the axially opposite end surfaces 37b, 37b of the first sub-guide shaft 37 are held by being in point contact with the holding support projections 36a, 36a, so that the stable holding condition of the first sub-guide shaft 37 with respect to the guide bearings 32, 32 may be realized.

The disc part 30 is fixedly provided with flat yokes 38, 38 by means of bonding etc., for instance (See FIG. 5). The yokes 38, 38 are fixed to positions close to the lower end and the left end on the front surface of the disc part 30, respectively. Driving magnets 39, 39 are fixedly mounted to the front surfaces of the yokes 38, 38, respectively.

The base frame 29 is fixedly provided with a first guide shaft 40. The first guide shaft 40 is fixed by means of pressure insertion, to the supported surface part 31 with being parallel to the first sub-guide shaft 37, for example, a portion fixed by pressure insertion except for the opposite ends is located at the fore of the disc part 30.

Figure 12:
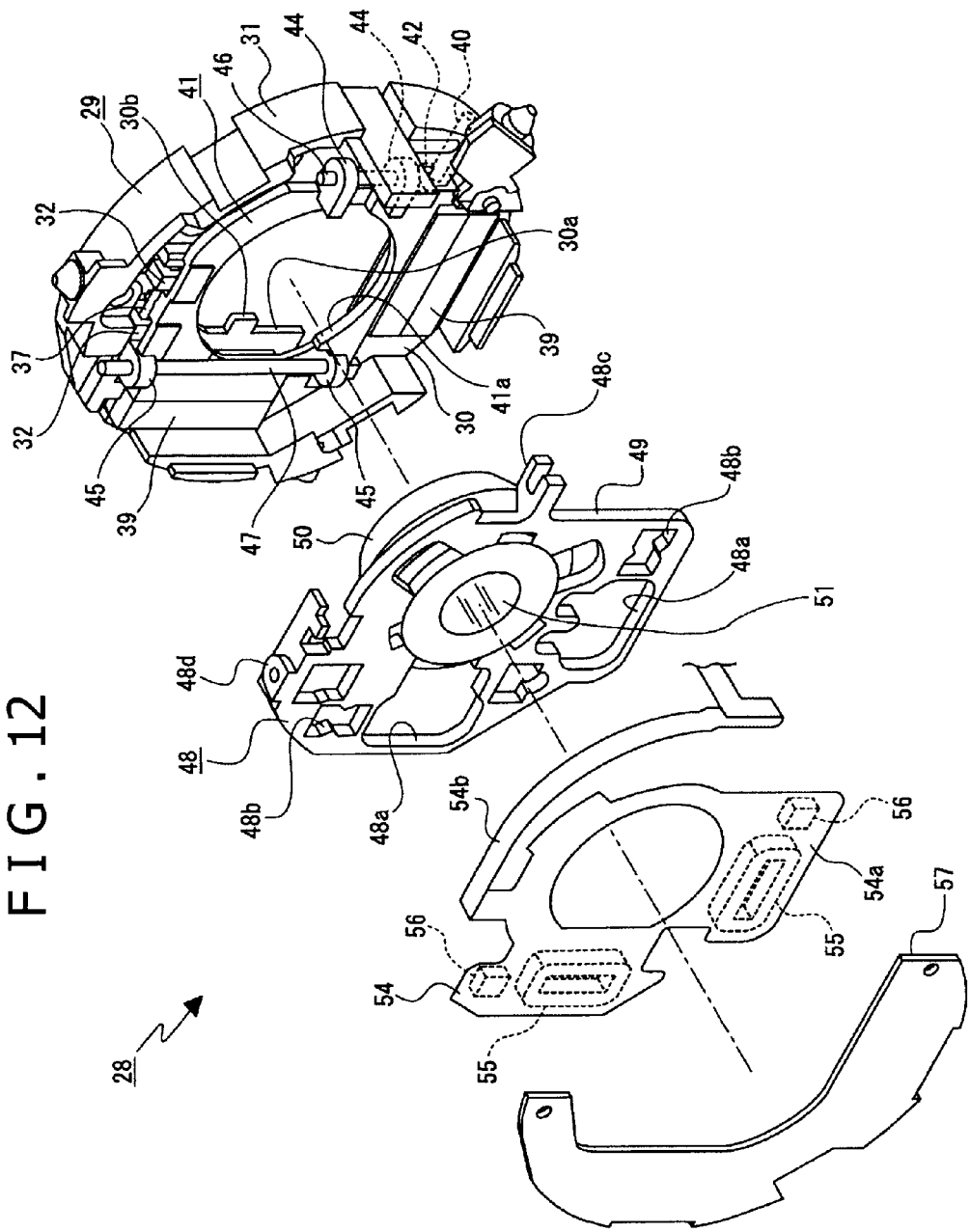
Figure 13:
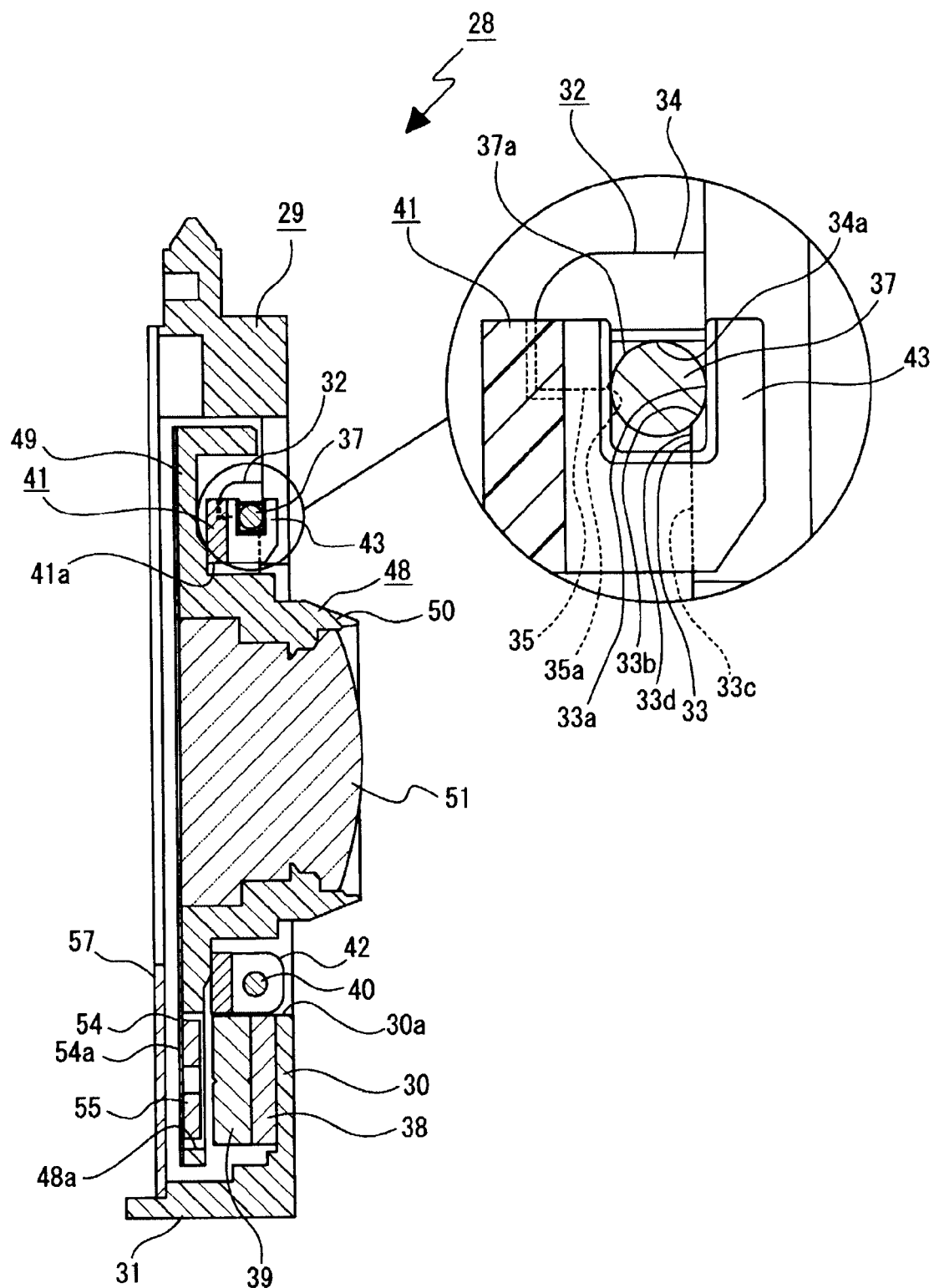

The first correcting moving frame 41 is supported with the base frame 29 through the first sub-guide shaft 37 and the first guide shaft 40 movably in the lateral direction (a yaw direction being as a first direction) (See FIGS. 12 and 13).

The first correcting moving frame 41 has a lens insertion hole 41a in the center. The first correcting moving frame 41 has, at the lower end, laterally spaced first shaft support parts 42, 42, and at the upper end, a first sub-shaft support part 43 taking the form of a channel having rectangular shape without left vertical line opened to the upper side as viewed in sectional form. The first correcting moving frame 41 has vertically spaced second sub-shaft support parts 44, 44 at the left end, and vertically spaced second shaft support parts 45, 45 at the right end.

In the first correcting moving frame 41, the first sub-shaft support part 43 in the form of the channel having a rectangular shape without left vertical line opened to the upper side is engaged with the first sub-guide shaft 37 from the lower side, causing the first guide shaft 40 to be inserted between the first shaft support parts 42, 42 at the time of pressure insertion into the supported surface part 31 of the base frame 29. Thus, the first sub-shaft support part 43 is supported by the first sub-guide shaft 37 in the slidable manner, while the first shaft support parts 42, 42 are supported by the first guide shaft 40 in the slidable manner.

As described above, the first sub-guide shaft 37 is inserted from the lower side to the guide bearings 32, 32 respectively in the form of the channel having a rectangular shape without left line opened to the bottom, causing the first sub-shaft support part 43 in the form of the channel having a rectangular shape without a left line opened to the top to be engaged with the first sub-guide shaft 37 from the lower side (See FIG. 13). Thus, the first sub-guide shaft 37 is sandwiched, from the top and the bottom, between the guide bearings 32, 32 respectively in the form of the channel having a rectangular shape without a left line opened to the bottom and the first sub-shaft support part 43 in the form of the channel having a rectangular shape without a left line opened to the top, resulting in achievement of the stabled hold condition of the first sub-guide shaft 37 with respect to the guide bearings 32, 32 and a stabled mounting condition of the first correcting moving frame 41 with respect to the first sub-guide shaft 37, as well as in secure achievement of an excellent performance of fixing-up of the first correcting moving frame 41 with respect to the first sub-guide shaft 37.

A second sub-guide shaft 46 is fixed to the second sub-shaft support parts 44, 44 of the first correcting moving frame 41 by pressure insertion, for instance.

Figure 14:
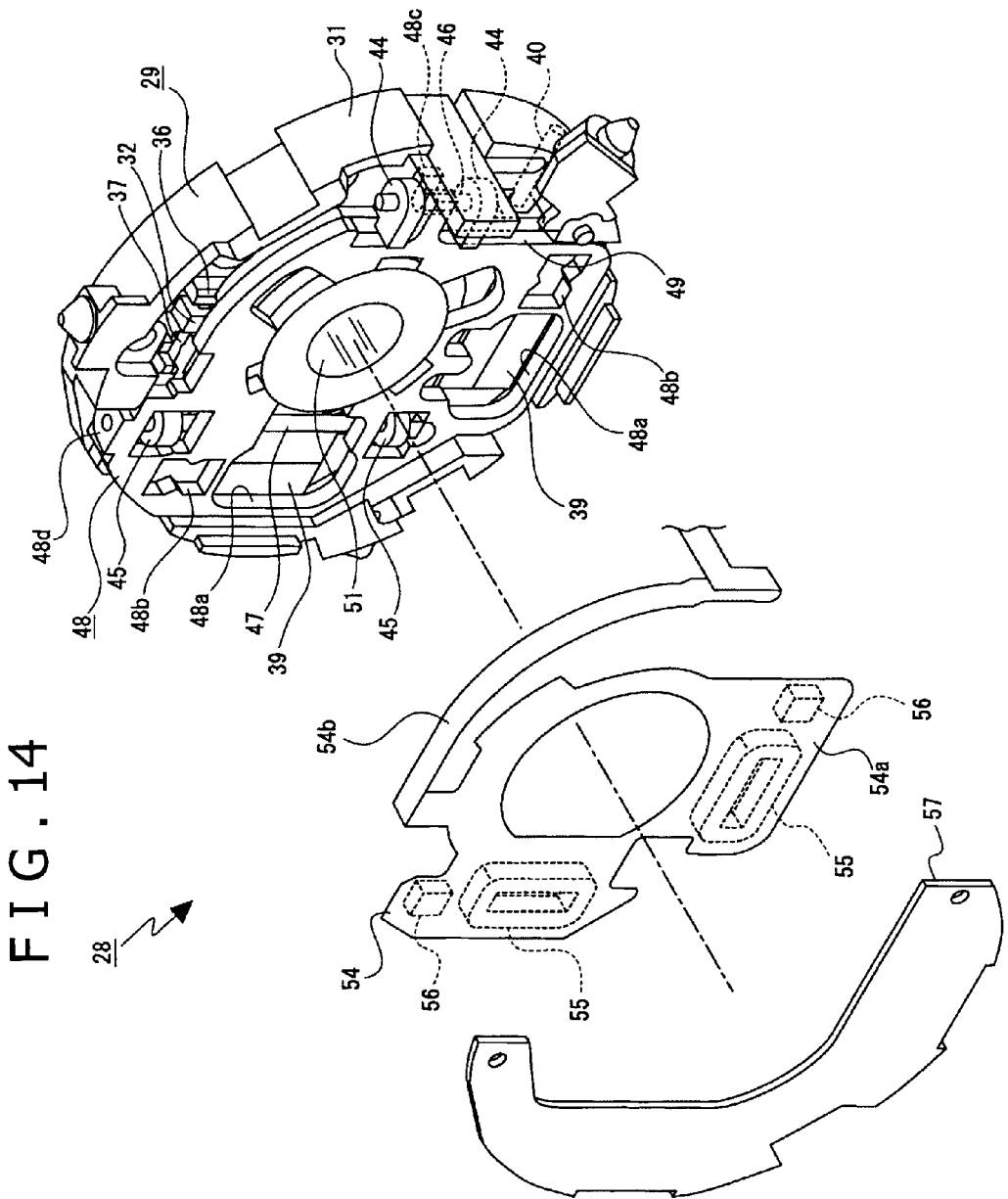

A second correcting moving frame 48 is supported by the first correcting moving frame 41 through the second sub-guide shaft 46 and a second guide shaft 47 movably in the vertical direction (a pitch direction specified as a second direction)(See FIG. 14).

The second correcting moving frame 48 has an approximately flat-shaped base plate part 49 facing in the longitudinal direction, and a lens holding part 50 protruding rearward from the approximate center of the base plate part 49 (See FIGS. 5, 6 and 12). A lens group 51 is held inside the lens holding part 50.

The base plate part 49 of the second correcting moving frame 48 has longitudinally pierced openings 48a, 48a respectively at the right end and the lower end, and sensor arrangement holes 48b, 48b respectively are arranged near to the openings 48a, 48a.

The base plate part 49 has, at the left end, a supported projection 48c taking the form of a channel having a rectangular shape without a left line opened to the left, and at positions close to the right end, vertically spaced supported cylindrical parts 48d, 48d are provided.

Figure 15:
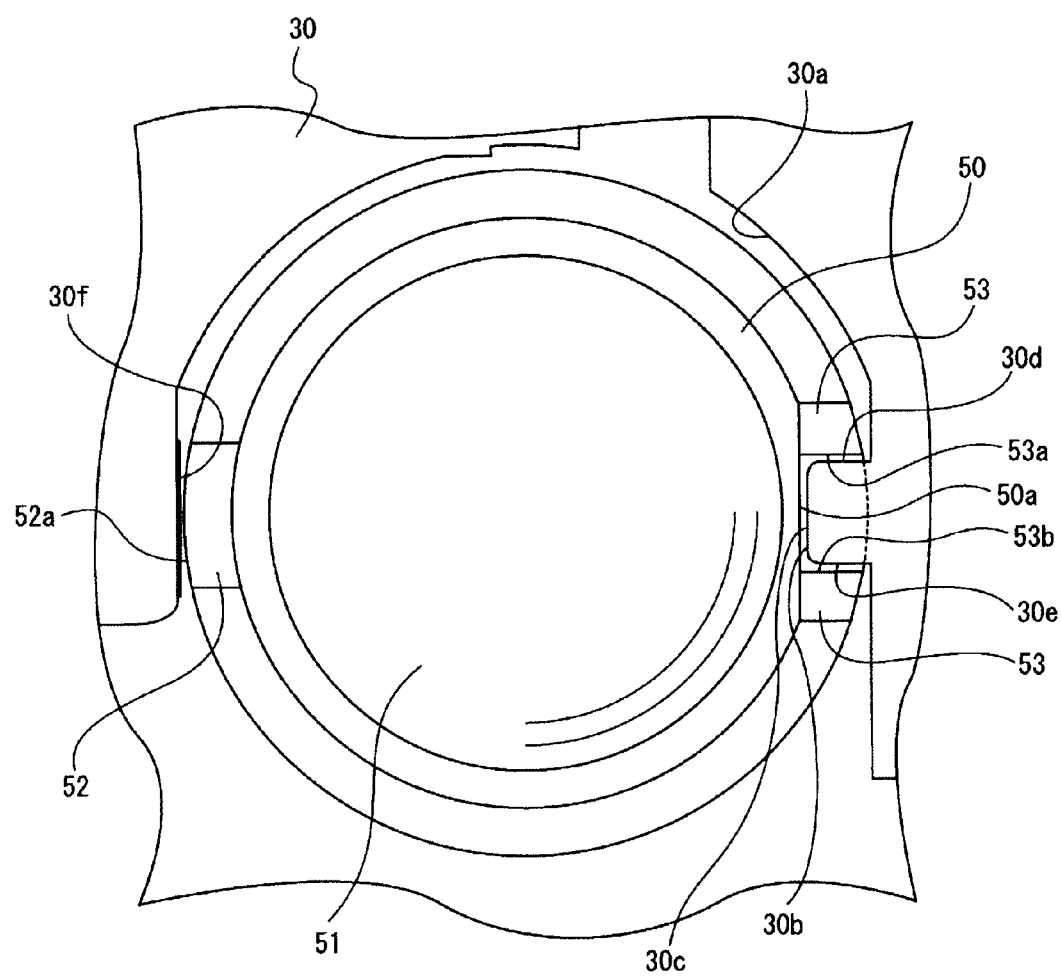

As shown in FIG. 15, the lens holding part 50 has a rightward protrudent first regulated projection 52 at the right end on the front end, and the right side surface of the first regulated projection 52 forms a first regulated surface 52a.

As shown in FIGS. 6 and 15, the lens holding part 50 has vertically spaced rightward protrudent second regulated projections 53, 53 at the left end on the rear end. The lower surface of the second regulated projection 53 on the upper side and the upper surface of the second regulated projection 53 on the lower side are respectively formed as second regulated surfaces 53b, 53c. Within the range of the outer circumference of the lens holding part 50, a surface part located between the second regulated projections 53, 53 and facing the right is formed as a first regulated surface 50a. The first regulated surfaces 50a, 52a and the second regulated surfaces 53b, 53c are all located within the same plane orthogonal to the optical axis direction.

As shown in FIG. 14, in the second correcting moving frame 48, the supported projection 48c is engaged with the second sub-guide shaft 46 from the right, and the second guide shaft 47 is fixed to the supported cylindrical parts 48d, 48d by pressure insertion, for instance, and during the insertion, the second guide shaft 47 is inserted between the second shaft support parts 45, 45 of the first correcting moving frame 41 in the slidable manner. Thus, the second guide shaft 47 is supported by the second shaft support parts 45, 45 in the slidable manner, while the supported projection 48c is supported by the second sub-guide shaft 46 in the slidable manner.

The second correcting moving frame 48 is made movable with respect to the first correcting moving frame 41 in the vertical direction, and is also adaptable to be moved in the lateral direction together when the first correcting moving frame 41 is moved in the lateral direction.

It is noted that the above has been described as related to one embodiment adapted to hold the first sub-guide shaft 37 is held by the guide bearings 32, 32 by the elasticity. Alternatively, it is also allowable to effect holding of the first guide shaft 40, the second sub-guide shaft 46 and the second guide shaft 47 by the elasticity by providing guide bearings having the same form as form of the guide bearings 32, 32.

With the second correcting moving frame 48 supported by the first correcting moving frame 41, the openings 48a, 48a are respectively located at the fore side of the driving magnets 39, 39 fixedly mounted to the base frame 29.

Figure 16:
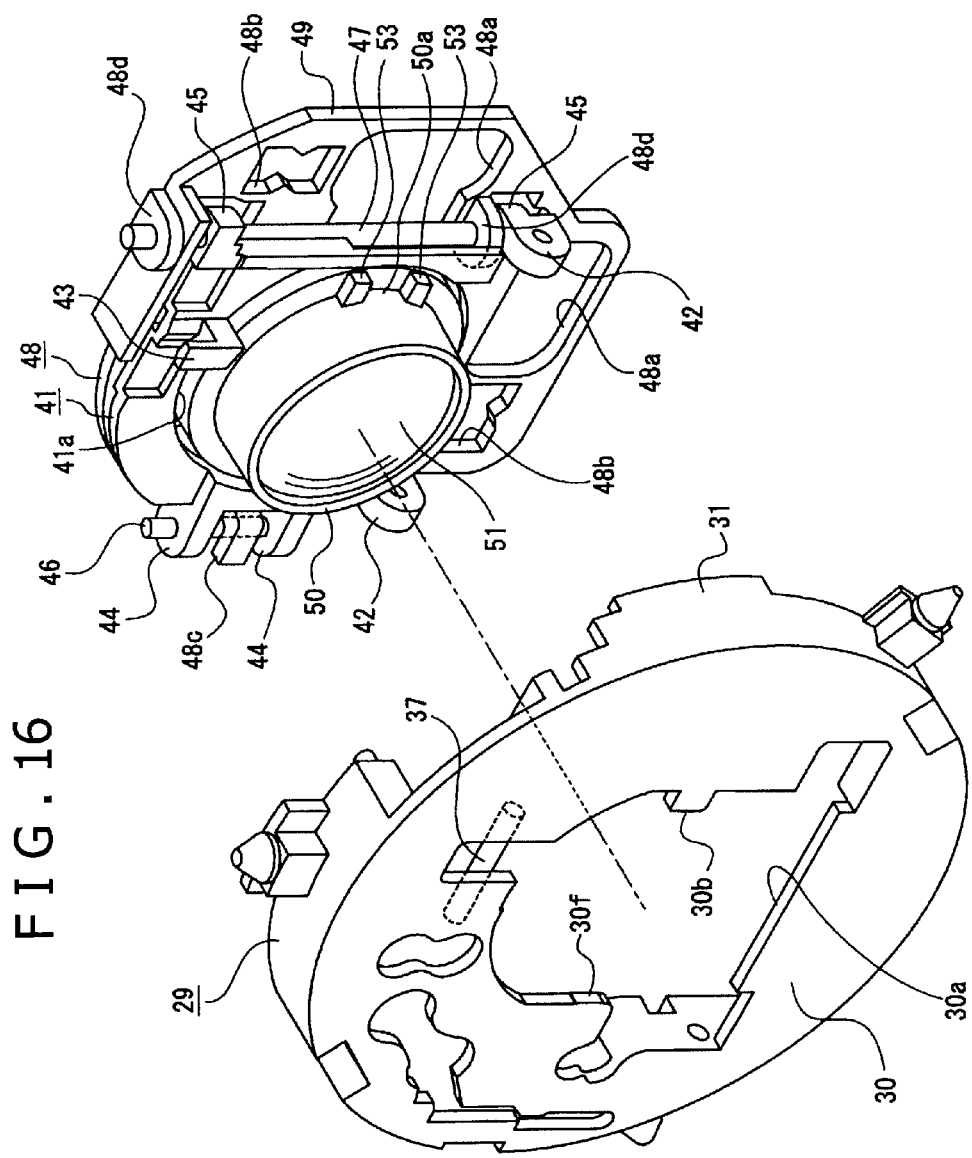
Figure 17:
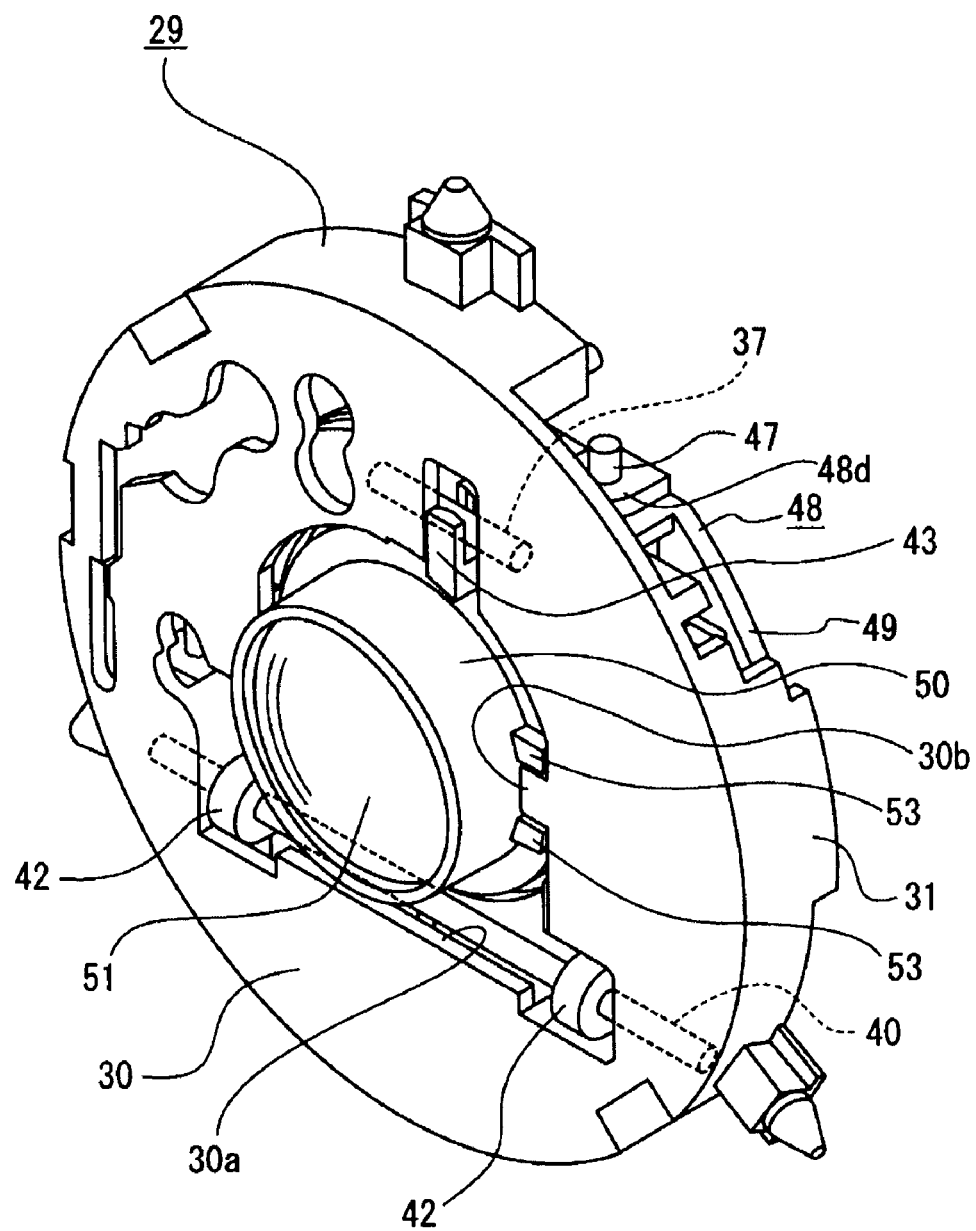

In the second correcting moving frame 48, the lens holding part 50 is placed in the lens arrangement hole 30a of the base frame 29 through insertion into the lens insertion hole 41a of the first correcting moving frame 41 (See FIGS. 16 and 17). At this time, as shown in FIG. 15, the first regulated projection 52 of the second correcting moving frame 48 is located at a position facing the first regulating part 30f of the base frame 29, while the regulating projection 30b of the base frame 29 is located by being inserted between the second regulated projections 53, 53 of the second correcting moving frame 48.

Figure 18:
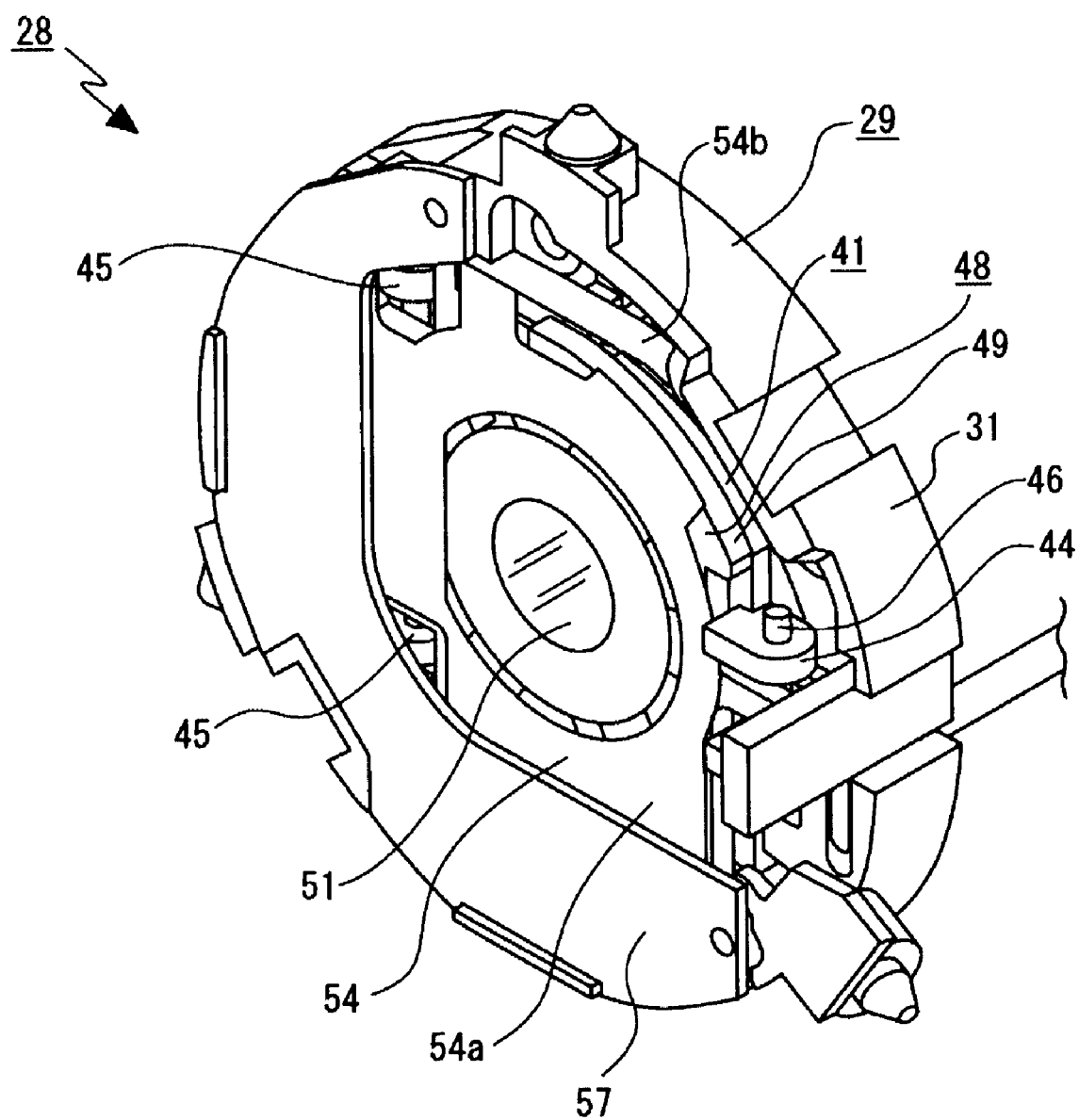

A circuit substrate 54 is mounted to the front surface of the second correcting moving frame 48 (See FIGS. 14 and 18). The circuit substrate 54 is composed of a base surface part 54a facing the longitudinal direction, and a connection surface part 54b protruding from an upper end of the base surface part 54a.

The base surface part 54a has driving coils 55, 55 integrally provided at the right end and the lower end respectively. The base surface part 54a has, in the vicinity of the driving coils 55, 55 respectively, hall devices 56, 56 adapted to detect positions of the first correction moving frame 41 and the second correcting moving frame 48.

In the circuit substrate 54, the base surface part 54a is mounted to the front surface of the second correcting moving frame 48 by bonding etc., and the connection surface part 54b is connected to a power drive circuit (not shown). With the circuit substrate 54 mounted to the front surface of the second correcting moving frame 48, the driving coils 55, 55 are respectively located inside the openings 48a, 48a of the second correcting moving frame 48, while the hall devices 56, 56 are respectively inserted to the sensor arrangement holes 48b, 48b of the second correcting moving frame 48.

Provided that the first correcting moving frame 41 is supported, in a laterally movable condition, by the base frame 29 fixedly provided with the driving magnets 39, 39, the second correcting moving frame 48 is supported, in a vertically movable condition, by the first correcting moving frame 41, and the circuit substrate 54 is mounted to the second correcting moving frame 48, an approximately L-shaped outside yoke 57 is mounted to the front surface of the base frame 29 by bonding etc., resulting in formation of the movable lens unit 28 (See FIG. 18).

With respect to the movable lens unit 28, if a drive current is supplied from the power drive circuit to the driving coils 55, 55, thrust in a predetermined direction is generated by the driving coils 55, 55 and the driving magnets 56, 56 depending on the direction of the supplied drive current. The thus generated thrust causes the first correcting moving frame 41 and the second correcting moving frame 48 adapted to hold the lens group 51 to be guided by the first guide shaft 40 and the first sub-guide shaft 37 and integrally moved in the lateral direction (the first direction). The thrust generated also causes the second correcting moving frame 48 adapted to hold the lens group 51 to be guided by the second guide shaft 47 and the second sub-guide shaft 46 and moved in the vertical direction (the second direction). Thus, movement of the lens group 51 within the plane orthogonal to the optical axis permits a focal position to be corrected, resulting in achievement of image blur prevention.

It is noted that the driving magnets 39, 39 also function as magnets for detection of positions of the hall devices 56, 56, and are sized to be long in the predetermined direction so as to face areas from the driving coils 55, 55 to the hall devices 56, 56.

During the image blur correcting operations as described above, more movements than required for the second correcting moving frame adapted to hold the lens group 51 with respect to the base frame 29 in the first direction and the second direction are regulated (See FIG. 15).

Regulation of the movement of the second correcting moving frame 48 in the first direction is made by contact between the first regulated surface 52 formed on the first regulated projection 52 of the second correcting moving frame 48 and the first regulating part 30f formed on the base frame 29 and by contact between the first regulated surface 50a of the lens holding part 50 and the first regulating part 30c formed on the regulating projection 30b of the base frame 29.

Regulation of the movement of the second correcting moving frame 48 in the second direction is made by contact between the second regulated surface 53a on the second regulated projection 53 of the second correcting moving frame 48 and the second regulating part 30d formed on the regulating projection 30b of the base frame 29 and by contact between the second regulated surface 53b provided on the second regulated projection 53 of the second correcting moving frame 48 and the second regulating part 30e formed on the regulating projection 30b of the base frame 29.

In this manner, according to the image-capture apparatus 1, the regulation of the vertical and lateral movements of the second correcting moving frame 48 adapted to hold the lens group 51 is performed between the base frame 29 without intervention of the first correcting moving frame 41. Thus, a tolerance of the second correcting moving frame 48 with respect to the first correcting moving frame 41 has no effect on position accuracy, resulting in achievement of an increased accuracy of detection of a position of the lens group 51 with respect to the base frame 29.

In addition, all the parts adapted to regulate the movements of the second correcting moving frame 48 with respect to the base frame 29 are located within the same plane orthogonal to the optical axis direction, resulting in achievement of the increased accuracy of detection of the position of the lens group 51, as well as the downsizing of the image-capture apparatus 1.

Further, the movement of the second correcting moving frame 48 with respect to the base frame 29 is regulated in a condition where the lens holding part 50 of the second correcting moving frame 48 is placed in the lens arrangement hole 30a of the base frame 29 through insertion into the lens insertion hole 41a of the first correcting moving frame 41. Thus, it is possible to apply a simple configuration to provide the first regulating parts 30c, 30f and the second regulating parts 30d, 30e within the same plane.

Furthermore, the first regulating part 30c and the second regulating parts 30d, 30e of the base frame 29 are provided at the opposite sides with the lens group 51 in between in the direction orthogonal to the optical axis direction. Thus, upper and lower portions of the movable lens unit 28, that is, portions where the first regulating part 30c and the second regulating parts 30d, 30e are not provided may be utilized as an installation space for other parts, resulting in achievement of the downsizing of the image-capture apparatus 1 based on effective space utilization.

Besides, all the parts adapted to regulate the movements of the second correcting moving frame 48 with respect to the base frame 29 are located around the lens group 51. Thus, it is possible to detect the position of the lens group 51 with stabled accuracy at all times.

The specific forms and structures of the various parts shown in the above embodiment are merely for the purpose of description of the embodiment in implementation of the present invention. Thus, it is to be understood that the technical scope of the present invention should be interpreted without being limited to the above.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-041067 filed in the Japanese Patent Office on Feb. 21, 2007, the entire content of which being incorporated herein by reference.

What is claimed is:

1. A image blur correcting mechanism for effecting image blur correction, comprising:
   a first guide shaft extending in a first direction which is a predetermined direction orthogonal to an optical axis direction of a lens group;
   a base frame supporting the first guide shaft;
   a first correcting moving frame supported by the base frame through the first guide shaft movably in the first direction;
   a second guide shaft extending in a second direction orthogonal to both of the optical axis direction and the first direction and supported by the first correcting moving frame; and
   a second correcting moving frame being supported by the first correcting moving frame through the second guide shaft movably in the second direction, while being movable in the first direction along movement of the first correcting moving frame with respect to the base frame in the first direction, wherein
   the image blur correction is performed by moving the first correcting moving frame in the first direction and moving the second correcting moving frame in the second direction,
   the base frame has a first limiting part and a second limiting part respectively configured to limit an amount of movements of the second correcting moving frame in the first direction and the second direction by contact made between the second correcting moving frame and the base frame; and
   the first limiting part and the second limiting part are provided within a single plane which is orthogonal to the optical axis direction.

2. The image blur correcting mechanism according to claim 1, wherein the base frame, the first correcting moving frame and the second correcting moving frame are arranged in order in the optical axis direction; the base frame has a lens arrangement hole formed thereon; the first correcting moving frame has a lens insertion hole formed thereon; a lens holding part of the second correcting moving frame is placed in the lens arrangement hole of the base frame through insertion into the lens insertion hole of the first correcting moving frame; and the lens holding part of the second correcting moving frame contacts the first regulating part and the second regulating part of the base frame.

3. The image blur correcting mechanism according to claim 2, wherein the first regulating part and the second regulating part of the base frame are provided at the opposite sides with the lens holding part of the second correcting moving frame in between in the direction orthogonal to the optical axis direction.

4. The image blur correcting mechanism according to claim 2, wherein the first regulating part and the second regulating part of the base frame are located around the lens holding part of the second correcting moving frame.

5. The image blur correcting mechanism according to claim 1, further comprising:
- a first sub-shaft support in the first correcting moving frame being supported by a first sub-guide shaft in the base frame movably in the first direction.

6. The image blur correcting mechanism according to claim 1, further comprising:
- a second sub-guide shaft in the first correcting moving frame parallel to the second guide shaft supporting the second correcting frame movably in the second direction.

7. The image blur correcting mechanism according to claim 1, further comprising:
- a circuit substrate mountable to the second correcting frame including driving coils and hall devices to detect a position of the first correcting moving frame and a position of the second correcting moving frame.

8. An image-capture apparatus having a image blur correcting mechanism for effecting image blur correction comprising:
- a first guide shaft extending in a first direction which is a predetermined direction orthogonal to an optical axis direction of a lens group;
- a base frame supporting the first guide shaft;
- a first correcting moving frame supported by the base frame through the first guide shaft movably in the first direction;
- a second guide shaft extending in a second direction orthogonal to both of the optical axis direction and the first direction and supported by the first correcting moving frame; and
- a second correcting moving frame being supported by the first correcting moving frame through the second guide shaft movably in the second direction, while being movable in the first direction along movement of the first correcting moving frame with respect to the base frame in the first direction, wherein the image blur correction is performed by moving the first correcting moving frame in the first direction and moving the second correcting moving frame in the second direction, the base frame has a first regulating part and a second regulating part respectively configured to regulate an amount of movements of the second correcting moving frame in the first direction and the second direction by contact made between the second correcting moving frame and the base frame, and the first regulating part and the second regulating part are located within a single plane which is orthogonal to the optical axis direction.

\* \* \* \* \*